April 12, 1938.   L. E. YOUNIE   2,114,129
DREDGE BUCKET
Filed Oct. 28, 1935
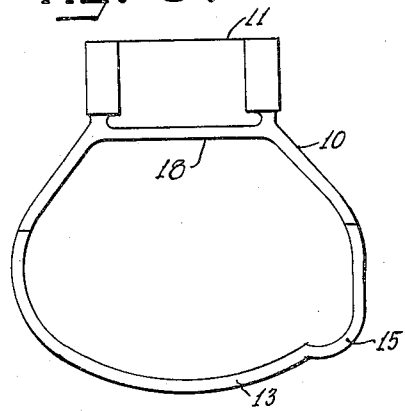
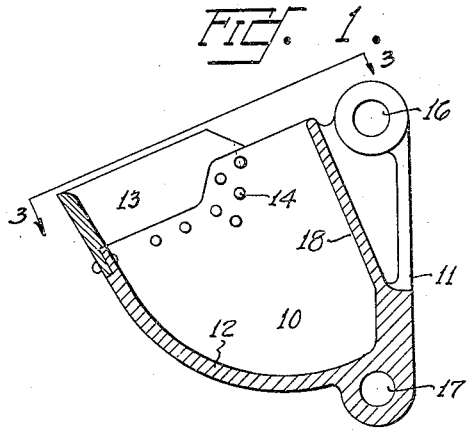
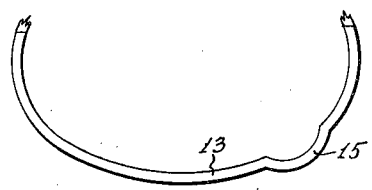
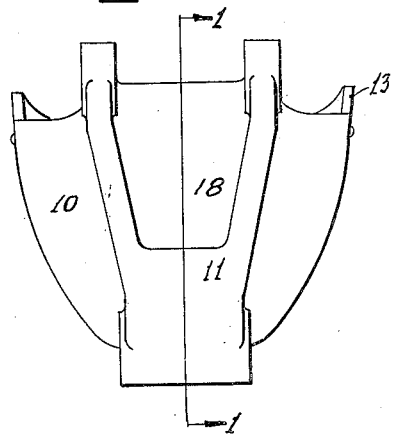
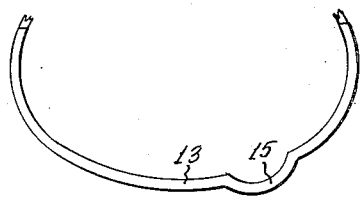
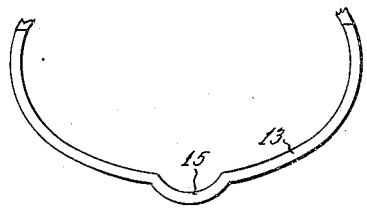
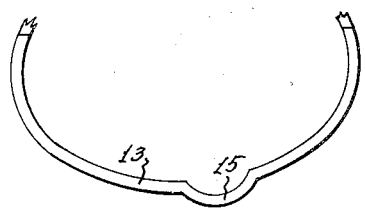
INVENTOR
L. E. YOUNIE
BY
ATTORNEY Patented Apr. 12, 1938

2,114,129

UNITED STATES PATENT OFFICE 2,114,129

DREDGE BUCKET

Lewis E. Younie, Portland, Oreg., assignor to Electric Steel Foundry Company, Portland, Oreg.

Application October 28, 1935, Serial No. 47,074

2 Claims. (Cl. 37—141)

This invention relates generally to excavating machinery, and particularly to a dredge bucket.

The main object of this invention is the construction of a dredge bucket which will have an improved cutting action and which will so reduce the amount of power required and the resistance offered to the excavating operation that the parts of the bucket may be made correspondingly lighter.

The second object is to so construct the buckets so that when used on a chain each successive bucket will have a cutting lip projecting outside of its cutting edge out of alinement with a corresponding cutting edge of the bucket immediately preceding or following same.

I accomplish these and other objects in the manner set forth in the following specification as illustrated in the accompanying drawing, in which:

Fig. 1 is a section taken along the line 1—1 in Fig. 2.

Fig. 2 is a rear elevation of the bucket.

Fig. 3 is an elevation taken along the line 3—3 in Fig. 1 showing a cutting edge lip in one extreme lateral position.

Fig. 4 is a view similar to Fig. 3 but showing the cutting lip somewhat nearer the center of the bucket.

Fig. 5 is a view similar to Fig. 4 but showing the cutting lip still nearer the center of the bucket.

Fig. 6 is a view similar to Fig. 5 but showing the cutting lip almost at the center of the bucket.

Fig. 7 is a view similar to Fig. 6 but showing the cutting lip in the center of the bucket.

Similar numbers of reference refer to similar parts throughout the several views.

Referring in detail to the drawing, there is shown a common form of bucket 10 which is formed integral with the link 11 of a chain (not shown). The bucket 10 may be of any desired shape, in this instance having its bottom 12 rounded and having a cast cutting rim 13 around the open side thereof which is secured in place by means of the rivets 14. The rim 13 may take any desired shape, but has formed therein variously positioned cutting lips 15 which project beyond the outer edge of the cutting rim 13.

It will be noted in Figs. 1 to 7, inclusive, that the lips 15 are variously positioned ranging from one side of the bucket to the center thereof. Obviously other buckets will be provided having the cutting lips on the other side of the center line from those shown in Figs. 3 to 6, inclusive.

It must be understood that when these buckets are mounted on a chain, it is desirable to place the cutting lips 15 in echelon thereby dividing the cutting load among the various buckets, which results in a material decrease in the load imposed on the entire chain.

The link 11 is provided with usual holes 16 and 17 by means of which it may be fastened to its chain. A bucket back 18 is provided to extend from outside of the hole 16 to a line near the hole 17.

It can be seen from the foregoing that my improved bucket differs mainly from existing buckets of this type by attaching a cutting lip to the bucket which is outside the rim thereof. It will be noted that as these buckets with their variously placed lips enter the ground that they do so in the usual manner with addition that they dig out a rib which is substantially the same at one of the lips 15.

It must be understood that the buckets may be joined in direct succession or be separated by a chain link, which is simply shaped like the part 11 and provided with holes 16 and 17 as is the bucket itself, the various buckets being connected by means of pins, rivets or bolts (not shown), it being understood that the holes 16 of one bucket register with the hole 17 of the next bucket or link.

I claim:

1. A dredge bucket lip having a transversely curved bottom of substantially uniform thickness, the leading edge of said lip constituting a cutting edge and the opposite edge having means for securing same to a bucket, said cutting edge having an outwardly curved portion which is in transverse alinement with the main cutting edge but which projects outside of the main cutting edge, the trailing edge of said projecting portion merging with the main curve of said lip.

2. A dredge bucket lip of substantially uniform thickness having a smoothly curved bottom, said lip having means for attaching its rear edge to a bucket and having its leading edge in a straight plane, said leading edge being adapted for the cutting edge of said lip having an outwardly curved portion which has a smaller radius than does the main curvature of the lip.

LEWIS E. YOUNIE.